United States Patent
Smith et al.

(10) Patent No.: US 12,552,519 B2
(45) Date of Patent: Feb. 17, 2026

(54) DOUBLE FLANGED CLEVIS PINS FOR AIRCRAFT FLIGHT CONTROL CABLE PULLEY SYSTEMS

(71) Applicant: Textron Aviation Inc., Wichita, KS (US)

(72) Inventors: Gavin Smith, Wichita, KS (US); David M. Vallade, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 240 days.

(21) Appl. No.: 18/504,662

(22) Filed: Nov. 8, 2023

(65) Prior Publication Data

US 2025/0145277 A1    May 8, 2025

(51) Int. Cl.
*B64C 19/00* (2006.01)
*F16B 21/12* (2006.01)
*F16C 13/00* (2006.01)

(52) U.S. Cl.
CPC ............ *B64C 19/00* (2013.01); *F16B 21/125* (2013.01); *F16C 13/006* (2013.01)

(58) Field of Classification Search
CPC ............. F16B 21/12; Y10T 403/32893; Y10T 403/32861
USPC ........................................................ 411/347
See application file for complete search history.

(56) References Cited

U.S. PATENT DOCUMENTS

| | | | | |
|---|---|---|---|---|
| 355,980 | A * | 1/1887 | Dimon .................... | F16G 15/06 411/351 |
| 789,250 | A * | 5/1905 | Bastian ................... | A01D 90/00 296/9 |
| 805,760 | A * | 11/1905 | Tarbox ..................... | B66D 3/02 254/401 |
| 820,999 | A * | 5/1906 | Tarbox ..................... | B66D 3/04 254/409 |
| 1,189,037 | A * | 6/1916 | Austin .................... | B65G 17/38 198/618 |
| 1,347,211 | A * | 7/1920 | Crosby .................... | B66D 3/04 254/409 |
| 1,532,222 | A * | 4/1925 | Belding .................. | F41A 29/02 42/95 |
| 2,793,886 | A * | 5/1957 | Weiss ...................... | G05G 5/06 278/65 |
| 3,020,655 | A * | 2/1962 | Launder ................ | E02F 9/2841 37/453 |

(Continued)

*Primary Examiner* — Arfan Y. Sinaki
(74) *Attorney, Agent, or Firm* — NIXON & VANDERHYE P.C.

(57) ABSTRACT

Double flanged clevis pins are provided in aircraft flight control pulley systems and are mounted between the opposed side walls of the pulley mounting bracket at a closely spaced separation distance relative to a respective pulley and the cable retained within the pulley groove. The outboard facing surface of each of the clevis pin flanges is positioned in abutting relationship with an adjacent inboard facing surface portion of a respective one of the opposed side walls of the mounting bracket while outboard ends of the clevis pin extend coaxially outwardly therefrom and through the adjacent mounting bracket side wall. The central pin section of the clevis pin is therefore closely spaced above an adjacent portion of the circumferential edge of the pulley in which an aircraft control cable is received to thereby maintain the control cable within the pulley groove and prevent deformation of the bracket side walls.

14 Claims, 6 Drawing Sheets

(56) References Cited

U.S. PATENT DOCUMENTS

| | | | | | |
|---|---|---|---|---|---|
| 3,526,389 | A | * | 9/1970 | Horgan, Jr. | B66D 3/04 254/409 |
| 5,211,451 | A | * | 5/1993 | Matthews | B60T 15/048 403/19 |
| 5,669,576 | A | * | 9/1997 | Moody | B65H 75/08 242/560.3 |
| 5,860,623 | A | * | 1/1999 | Dunstan | F02C 7/20 60/797 |
| 6,499,684 | B2 | * | 12/2002 | Eaton | G11B 15/672 360/137 |
| 7,740,207 | B2 | * | 6/2010 | Ferraz | B64C 13/16 244/233 |
| 11,167,957 | B1 | * | 11/2021 | Striebel | B66C 1/66 |
| 2001/0013560 | A1 | * | 8/2001 | Eaton | G11B 23/107 242/348.2 |
| 2004/0195554 | A1 | * | 10/2004 | Renton | B63B 21/04 254/390 |
| 2008/0203371 | A1 | * | 8/2008 | Mauthner | B66D 3/04 254/391 |
| 2018/0087554 | A1 | * | 3/2018 | Dreher | F16B 21/12 |
| 2018/0093871 | A1 | * | 4/2018 | Nipper | B66D 3/10 |

\* cited by examiner

DOUBLE FLANGED CLEVIS PINS FOR AIRCRAFT FLIGHT CONTROL CABLE PULLEY SYSTEMS

FIELD

The embodiments disclosed herein relate generally to cable systems employed to control aerodynamic surfaces of an aircraft (e.g., elevator, ailerons and/or elevator) to thereby control the aircraft's flight characteristics. In especially preferred forms, the embodiments disclosed herein relate to an aircraft flight control cable pulley system which employs clevis pins to maintain separation and positioning of the flight control cable pully brackets.

BACKGROUND

Aircraft in flight are controlled through three axes of movement, namely pitch, roll and yaw axes. The control of the aircraft relative to such axes is commanded by a pilot (or autopilot if so equipped) to move aerodynamic surfaces in a coordinated manner and thereby cause the aircraft to assume the desired flight path and attitude. Many conventional aircraft employ mechanical linkages between a flight control inceptor (e.g., a control yoke or stick) positioned in the cockpit of the aircraft and the aerodynamic surfaces of the aircraft to control the pitch, roll and yaw flight characteristics of the aircraft, e.g., the elevator, ailerons and rudder, respectively. Such mechanical linkages thereby manipulate the aerodynamic surfaces in response to manual or autopilot inputs so as to cause the aircraft to assume desired flight attitudes. (See e.g., U.S. Pat. No. 7,740,207, the entire content of which is expressly incorporated hereinto by reference). Cable systems are conventionally employed in combination with various other mechanical linkages, such as cable pulleys, push rods, bell cranks, and the like.

Control cable pulleys are typically employed in pairs to assist in maintaining proper separation between the control cables directed to a particular aerodynamic surface. The pairs of control cable pulleys are usually rotatably connected to associated brackets which are in turn positionally secured to adjacent aircraft frame structures. It is critically important that the control cables be free from interference with one another and with other internal components in the aircraft, e.g., internal wiring and/or tubing bundles. Further it is critically important that the cables be reliably maintained within the pulley grooves as otherwise the cables may bind thereby hindering or preventing proper aircraft flight control.

It is towards ensuring the proper and reliable separation and positioning of aircraft control cables associated with a control cable pulley system that the embodiments disclosed herein are directed.

SUMMARY

In general the embodiments disclosed herein are directed toward the use of double flanged clevis pins in aircraft flight control pulley systems. The double flanged clevis pin is thus mounted between the opposed side walls of the pulley mounting bracket at a closely spaced separation distance relative to a respective pulley and the cable retained within the pulley groove such that each of the clevis pin flanges is positioned in abutting relationship with an interior portion of a respective one of the opposed side walls of the mounting bracket. Such an assembly thereby serves to maintain the control cable within the pulley groove and prevents one or both of the bracket side walls from being deformed over time that may in turn undesirably chafe the control cable.

According to some embodiments, a pulley assembly for an aircraft control cable system is provided which includes a pulley mounting bracket comprising opposed bracket side walls which is adapted to being fixed to adjacent aircraft structure, and at least one cable pulley mounted between the opposed bracket side walls of the mounting bracket for rotatable movement about a pulley axis and defining a circumferential groove for receiving a portion of an aircraft control cable therein. At least one clevis pin is provided which includes spaced apart integral flanges defining therebetween a central pin section and outboard ends extending coaxially outwardly from the central pin section outboard of the flanges. The outboard ends of the at least one clevis pin are mounted to and extend through a respective one of the bracket side walls such that outboard facing surfaces of the integral flanges are in abutting contact with an adjacent inboard facing surface of the bracket side walls so as to position the central pin section in spaced relationship to a portion of the circumferential groove of the at least one cable pulley. In preferred embodiments, the clevis pin is a one-piece (unitary) structure which includes the flanges, central pin section and opposed outboard ends.

Each of the outboard ends of the clevis may include a diametrical through hole for receiving a conventional cotter pin to thereby positionally retain the clevis pin relative to the bracket side walls. The pulley may include a pulley axle defining the pulley axis for mounting the at least one pulley to the opposed bracket side walls for rotatable movement about the pulley axis.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 1:
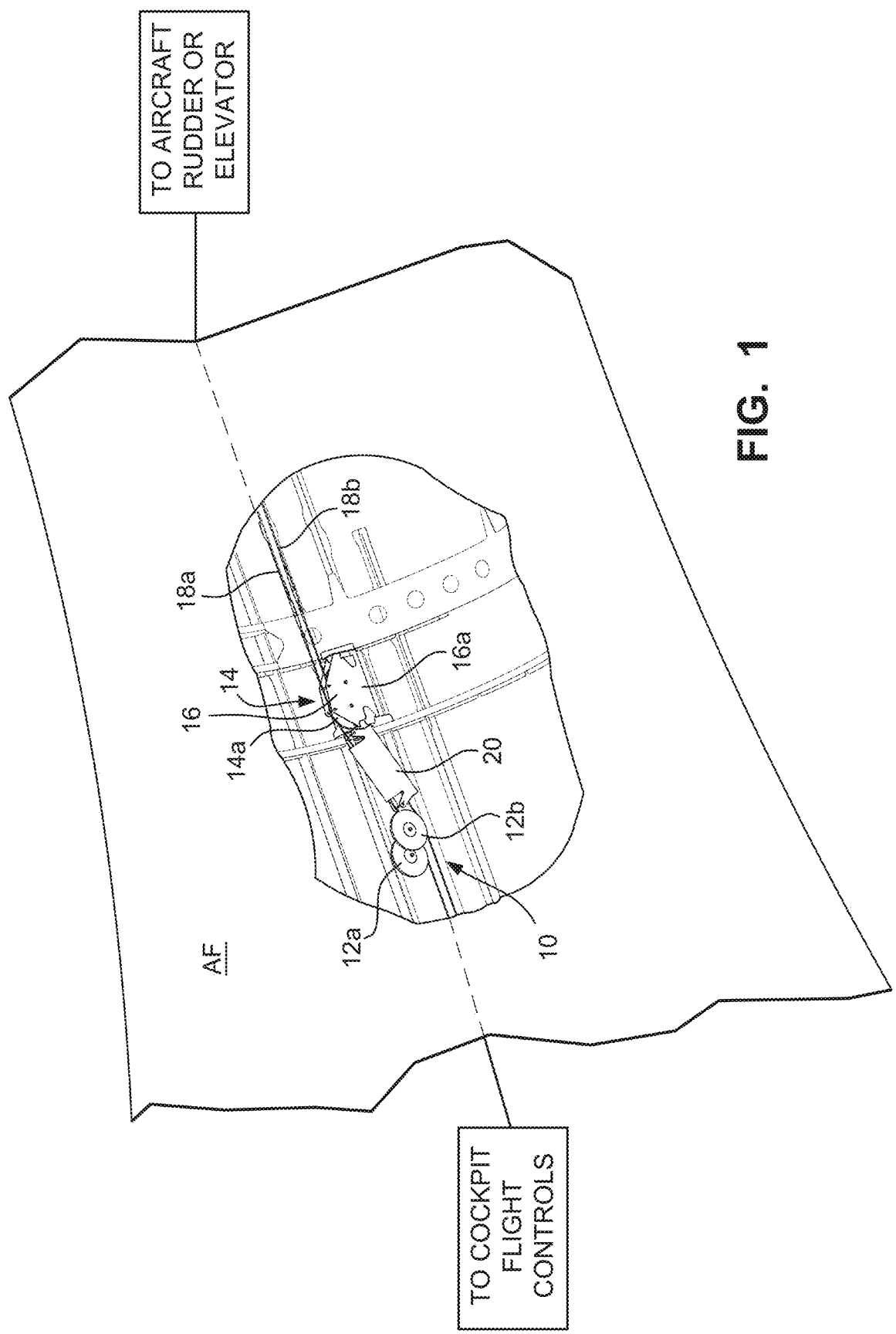
FIG. 1 is a perspective x-ray view of a section of an aircraft's fuselage showing an exemplary control cable pulley system in accordance with an embodiment of the invention.
Figure 2:
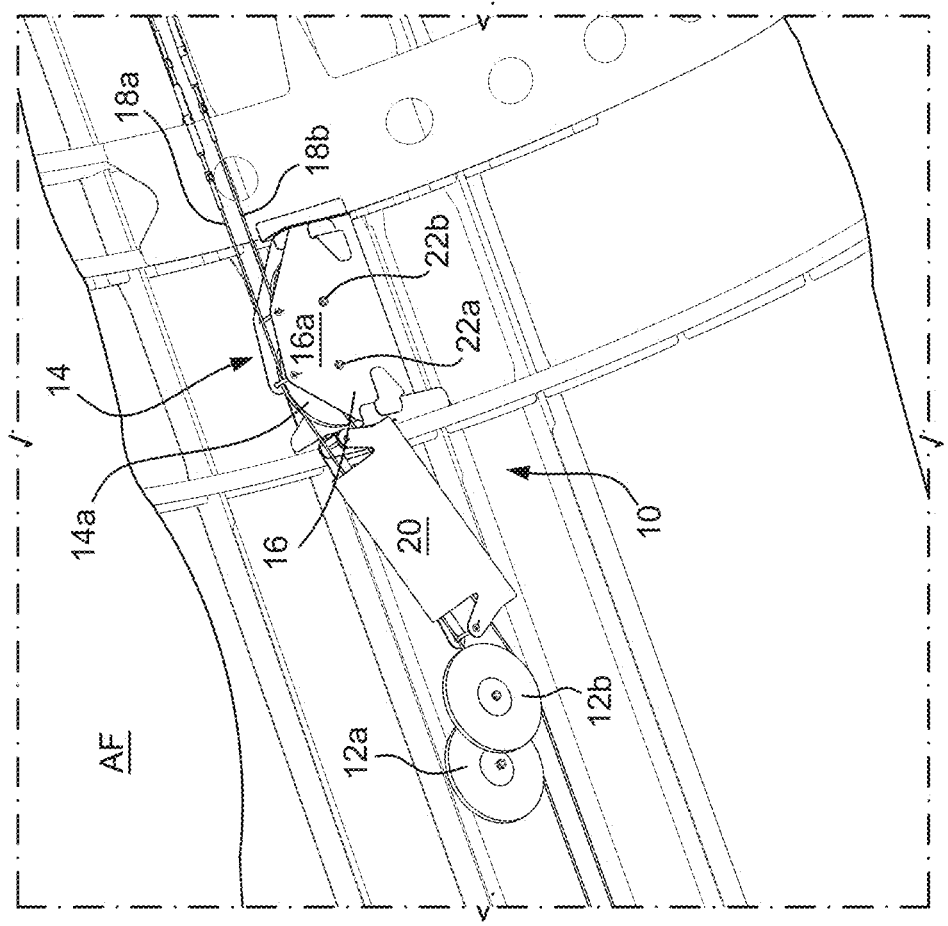
FIG. 2 is an enlarged perspective view of the control cable pulley system shown in FIG. 1.
Figure 3:
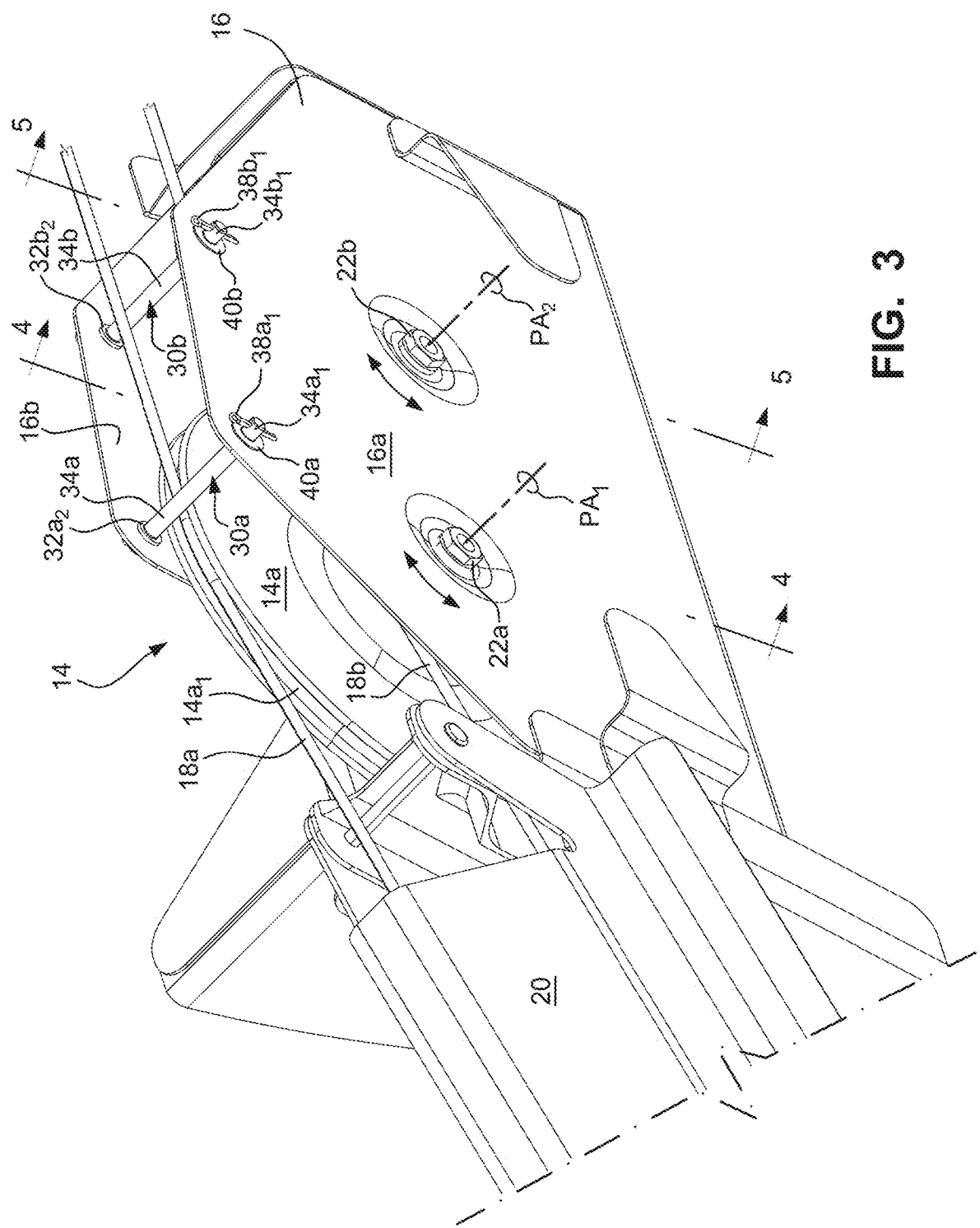
FIG. 3 is an enlarged perspective view of a mounting bracket for mounting a pair of control cable pulleys and the double flanged clevis pins in accordance with an embodiment of the invention operably positioned therein.
Figure 4:
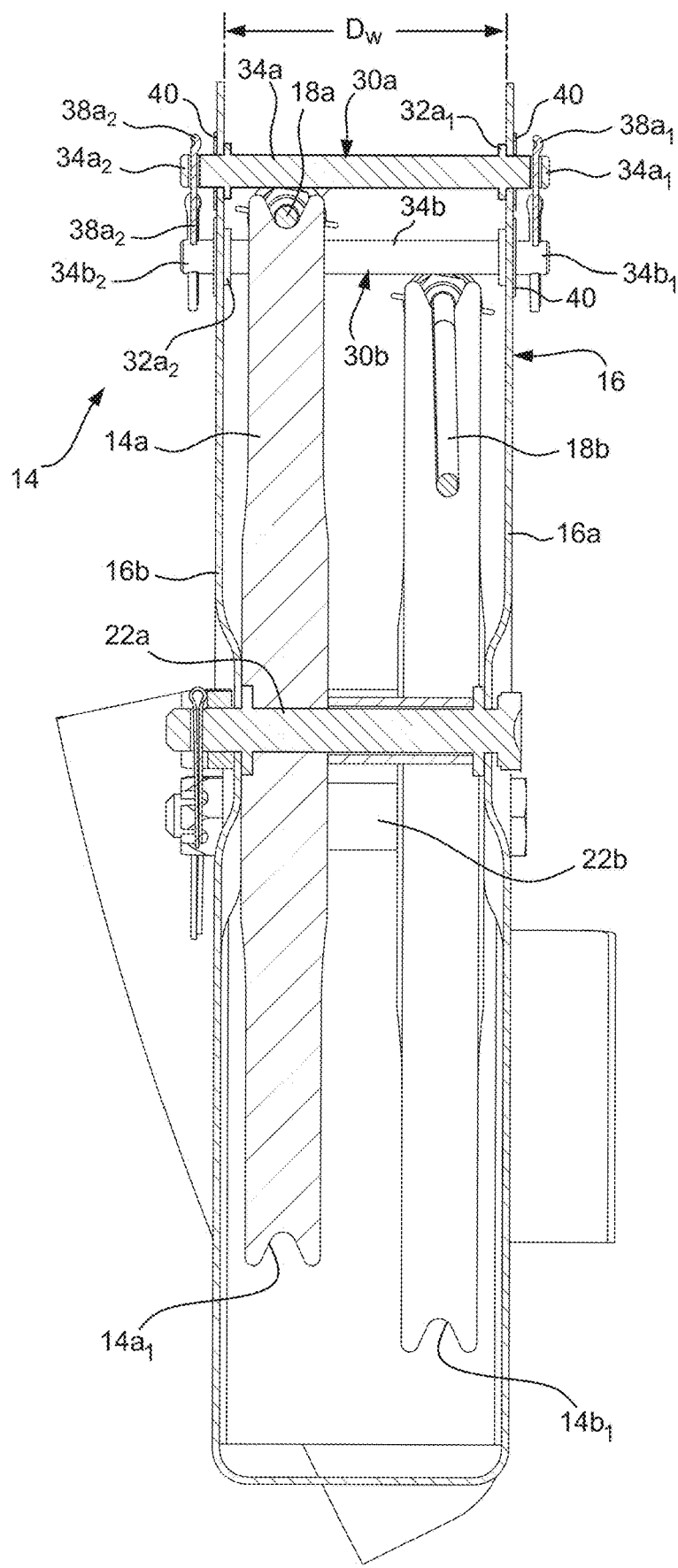
Figure 5:
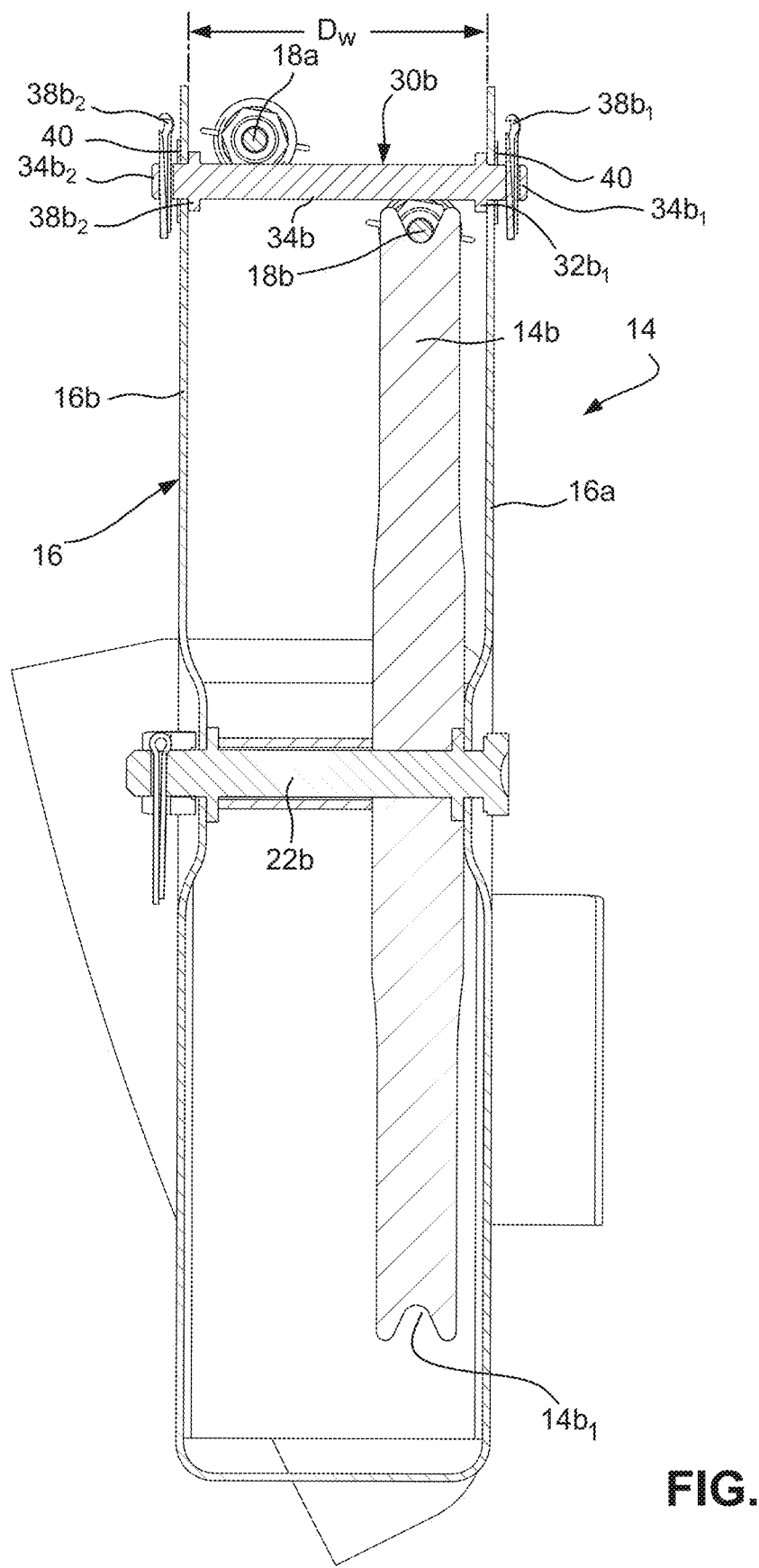
Figure 6:
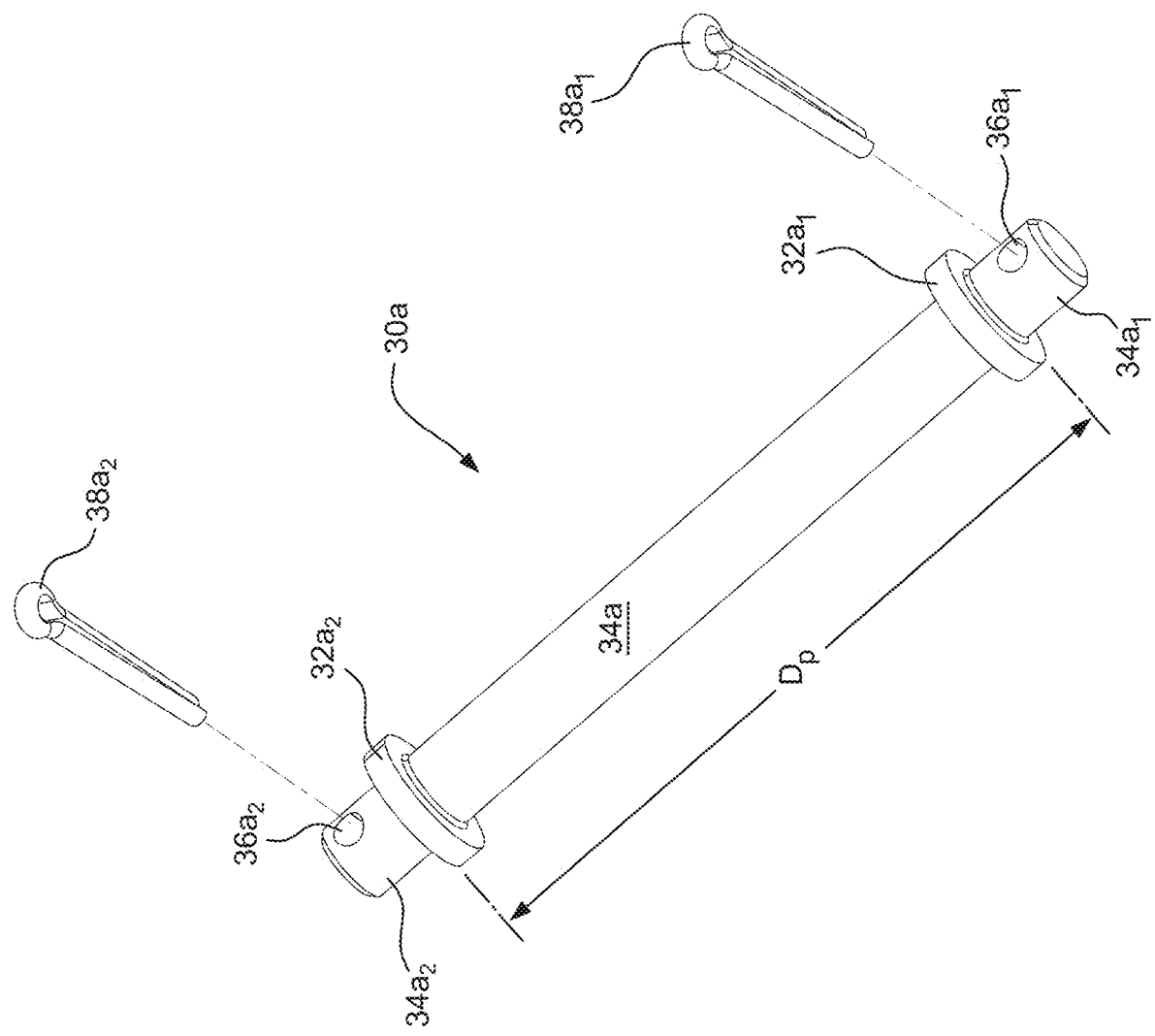

FIGS. 4 and 5 are cross-sectional elevational views of the mounting bracket and control cable pulleys as taken along lines 4-4 and 5-5, respectively, in FIG. 3; and FIG. 6 is an enlarged perspective view of a double flanged clevis pin in accordance with an embodiment of the invention that may be employed in the cable pulley system shown in FIGS. 1-5.

DETAILED DESCRIPTION OF EMBODIMENTS

Accompanying FIGS. 1-2 show a portion of an aircraft fuselage AF which comprises a control cable system 10 operably interconnecting the pilot manipulated cockpit flight controls (e.g., yoke, stick or rudder pedals) with the aircraft rudder or elevator. It will be understood that the control cable system 10 shown in FIG. 1 is exemplary for any of the cable flight control circuits used to manipulate the ailerons, rudder and elevator of the aircraft and thus may be positioned within other locations of the aircraft.

The control cable system 10 will include a pair of idler pulleys 12a, 12b and a pulley assembly 14 which includes a mounting bracket 16 for rotatably mounting a pair of guide pulleys 14a, 14b to adjacent internal fuselage structure. The pulleys 12a, 12b and 14a, 14b are positioned in side-by-side staggard relationship to one another and serve to guide the control cables 18a, 18b between the pilot manipulated cockpit flight controls and an aerodynamic flight control surface which in the exemplary embodiment shown could be the aircraft rudder or elevator. A portion of control cables 18a, 18b between the pairs of pulleys 12a, 12b and 14a, 14b may be covered by a sheet metal chafe guard 20.

The pulley assembly 14 and its associated structural components is perhaps better shown in FIGS. 3-5. The pulley assembly 14 will include pair of pulleys 14a, 14b that are rotatably mounted between opposed side walls 16a, 16b of the mounting bracket 16 by pulley axles 22a, 22b so as to be rotatable about the pulley axes $PA_1$ and $PA_2$, respectively. Each of the pulleys 14a, 14b defines a central circumferential groove 14a1, 14b1 to receive therein a portion of the cables 18a, 18b, respectively.

The ends of the opposed side walls 16a, 16b of the mounting bracket 16 are maintained in spaced relationship with one another by a distance $D_w$ (see FIGS. 4 and 5) by a pair of double flanged clevis pins 30a, 30b. The clevis pins 30a, 30b are positioned in closely spaced relationship to the circumferential edges of the pulleys 14a, 14b in an arcuate region of the groove $14a_1$, $14b_1$ in which a portion of the cables 18a, 18b, respectively, are received.

The clevis pin 30a is shown in an isolated and enlarged manner by FIG. 6 and is representative of the clevis pin 30b. The structural features of the clevis pin 30b will therefore be parenthetically identified adjacent to the structural features of the clevis pin 30a shown in FIG. 6 since each of the pins 30a, 30b is identical to one another. As shown, the clevis pin 30a (30b) is a one-piece (unitary) elongate structure which includes a pair of spaced apart integral flanges $32a_1$, $32a_2$ ($32b_1$, $32b_2$) defining therebetween an inboard cylindrical central pin section 34a (34b) and having outboard ends $34a_1$, $34a_2$ ($34b_1$, $34b_2$) extending coaxially outwardly therefrom. Each of the outboard ends $34a_1$, $34a_2$ ($34b_1$, $34b_2$) will include a diametrical through hole $36a_1$, $36a_2$ ($36b_1$, $36b_2$) that is sized and configured to receive therein a conventional cotter pin $38a_1$, $38a_2$ ($38b_1$, $38b_2$). The outboard faces of each of the flanges $32a_1$, $32a_2$ ($32b_1$, $32b_2$) will define a pin distance $D_p$ that is substantially equal to the wall distance $D_w$ between the inboard facing surfaces of the bracket walls 16a, 16b.

As described above, the clevis pin 30a (30b) will in use be positioned between the inboard facing surfaces of the bracket walls 16a, 16b so that each of the outboard faces of the integral flanges $32a_1$, $32a_2$ ($32b_1$, $32b_2$) are in respective abutting contact therewith. The outboard ends $34a_1$, $34a_2$ ($34b_1$, $34b_2$) will therefore extend coaxially outwardly from the cylindrical central pin section 34a (34b) through respective mounting apertures (not shown) formed in the side walls 16a, 16b. A conventional washer 40 may therefore be placed onto each of the outboard ends $34a_1$, $34a_2$ ($34b_1$, $34b_2$) and positioned adjacent to an outboard facing surface of the side walls 16a, 16b. The cotter pins $38a_1$, $38a_2$ ($38b_1$, $38b_2$) may then be inserted into a respective diametrical through hole $36a_1$, $36a_2$ ($36b_1$, $36b_2$) so as to positionally maintain the clevis pin 30a (30b) relative to an apex of the circumferential edge of the pulley 14a (14b) and the cable 18a (18b) positioned in the groove $14a_1$ ($14b_1$) thereof. As is known in the art, the legs of the cotter pins $38a_1$, $38a_2$ ($38b_1$, $38b_2$) may be bent around the outboard ends $34a_1$, $34a_2$ ($34b_1$, $34b_2$) of the clevis pin 30a (30b) to ensure positional retention. The integral flanges $32a_1$, $32a_2$ ($32b_1$, $32b_2$) in abutting contact with the bracket walls 16a, 16b will therefore maintain the separation distance $D_w$ therebetween and thereby prevent the walls from becoming bent which could lead to binding of the pulleys 14a, 14b and/or the cables 18a, 18b positioned therein.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A pulley assembly for an aircraft control cable system comprising:
   a pulley mounting bracket comprising opposed bracket side walls and adapted to being fixed to adjacent aircraft structure;
   at least one cable pulley mounted between the opposed bracket side walls for rotatable movement about a pulley axis and defining a circumferential groove for receiving a portion of an aircraft control cable therein; and
   at least one clevis pin comprising spaced apart integral flanges defining therebetween a central pin section and outboard ends extending coaxially outwardly from the central pin section, wherein
   the outboard ends of the at least one clevis pin are mounted to and extend through a respective one of the bracket side walls such that outboard facing surfaces of the integral flanges are in abutting contact with an adjacent inboard facing surface of the bracket side walls so as to position the central pin section in a spaced relationship to a portion of the circumferential groove of the at least one cable pulley.

2. The pulley assembly according to claim 1, wherein each of the outboard ends of the at least one clevis pin includes a diametrical through hole adapted to receive therein a cotter pin.

3. The pulley assembly according to claim 1, further comprising at least one pulley axle defining the pulley axis for mounting the at least one cable pulley to the opposed bracket side walls for rotatable movement about the pulley axis.

4. The pulley assembly according to claim 1, wherein the at least one clevis pin is a one-piece structure.

5. The pulley assembly according to claim 1, wherein
   the at least one cable pulley comprises first and second cable pulleys each defining a respective circumferential groove for receiving a respective portion of the aircraft control cable therein, and wherein
   the at least one clevis pin comprises a first and second clevis pins each including respective spaced apart integral flanges defining therebetween the central pin section and the outboard ends extending coaxially outwardly from the central pin section, and wherein
   each of the outboard ends of the first and second clevis pins is mounted to and extend through respective bracket side walls such that the outboard facing surfaces of the integral flanges are in abutting contact with a respective adjacent inboard facing surface of the bracket side walls so as to respectively position the central pin sections in a spaced relationship to a portion of the respective circumferential groove of each of the first and second pulleys.

6. The pulley assembly according to claim 5, wherein the first and second pulleys are mounted to the bracket side walls in a side-by-side staggered relationship.

7. The pulley assembly according to claim 6, further comprising first and second pulley axles each defining respective first and second pulley axes for the first and second pulleys and mounting the first and second pulleys to the opposed bracket side walls in the side-by-side staggered relationship for rotatable movement about the respective first and second pulley axes.

8. The pulley assembly according to claim 6, wherein each of the outboard ends of the first and second clevis pins includes a diametrical through hole adapted to receive therein a cotter pin.

9. The pulley assembly according to claim 6, wherein each of the first and second clevis pins is a one-piece structure.

10. An aircraft which comprises a cable control system which includes control cables, and the pulley assembly according to claim 1 operatively associated with the control cables of the cable control system.

11. A pulley assembly for an aircraft control cable system comprising:
a pulley mounting bracket comprising opposed bracket side walls and adapted to being fixed to adjacent aircraft structure;
first and second cable pulleys each mounted between the opposed bracket side walls in a side-by-side staggered relationship for rotatable movement about respective pulley axes, wherein each of the first and second cable pulleys have a circumferential edge and a cable receiving groove defined in the circumferential edge for receiving a portion of a respective aircraft control cable therein; and
first and second clevis pins mounted between the opposed bracket side walls parallel to the respective pulley axes of the first and second pulleys so that central cylindrical pin sections of the first and second clevis pins respectively extend in a spaced relation to the circumferential edges of the first and second pulleys across the portion of the respective aircraft control cable received in the respective cable receiving grooves thereof, wherein
each of the first and second clevis pins is a one-piece structure which includes:
(i) spaced apart integral flanges defining therebetween the central cylindrical pin section, and
(ii) outboard ends extending coaxially outwardly from the central pin section, and wherein
the outboard ends of the first and second clevis pin are mounted to and extend through a respective one of the bracket side walls such that outboard facing surfaces of the integral flanges thereof are in abutting contact with adjacent inboard facing surfaces of the bracket side walls.

12. The pulley assembly according to claim 11, wherein each of the outboard ends of the first and second clevis pins includes a diametrical through hole adapted to receive therein a cotter pin.

13. The pulley assembly according to claim 11, wherein the first and second pulleys comprise first and second pulley axles defining the respective pulley axes for mounting the first and second pulleys to the opposed bracket side walls for rotatable movement about the respective pulley axes.

14. An aircraft which comprises a cable control system which includes control cables, and the pulley assembly according to claim 11 operatively associated with control cables of the cable control system.

* * * * *